July 2, 1957 G. G. BLUEMINK 2,797,533
DRILL GRINDER

Filed March 7, 1952 7 Sheets-Sheet 1

Inventor:
Gary G. Bluemink
By Zahl & Gritzbaugh
Attorneys

July 2, 1957 G. G. BLUEMINK 2,797,533
DRILL GRINDER
Filed March 7, 1952 7 Sheets-Sheet 4

Inventor:
Gary G. Bluemink
By: Zabel & Gritzbaugh
Attorneys

July 2, 1957

G. G. BLUEMINK

2,797,533

DRILL GRINDER

Filed March 7, 1952

Inventor:
Gary G. Bluemink
By: Zabel & Gritzbaugh
Attorneys

United States Patent Office 2,797,533
Patented July 2, 1957

2,797,533

DRILL GRINDER

Gary G. Bluemink, Racine, Wis., assignor to The Dumore Company, Racine, Wis., a corporation of Wisconsin Application March 7, 1952, Serial No. 275,354

8 Claims. (Cl. 51—96)

This invention relates to improvements in drill grinders of the tilting chuck type.

In this type of grinder, the drill to be sharpened is mounted in a chuck, and the chuck is mounted for tilting about a horizontal axis. The parts are so arranged that when the chuck is tilted, the point of the drill is brought into engagement with a grinding wheel.

An advantage of this type of drill grinder is that it is possible to provide a guide against which the drill point may be aligned so as to secure proper orientation and feed. A characteristic of this type of drill grinder is that in forming a new cutting edge, a new point surface is also formed which is of cylindrical or conical shape; that is, the surface is that of a body of revolution.

The present invention is shown as being applied to a drill grinder in which the chuck may be indexed to provide two or more absolutely symmetrical lips and point surfaces. This indexing feature forms no part of the present invention, although it is an important feature of the drill grinder shown.

In providing a drill grinder of universal application, it is desirable to provide one which will create different lip clearance angles so that the drill can be adapted for use in metals of varying hardness. Such an adjustment would call for means for varying the distance between the surface of the grinding wheel and the tilting axis of the drill or drill chuck.

In prior art devices of this type and, in particular, in the device shown in Raney Patent No. 2,596,916 due to the wear of the grinding wheel, it is not possible to maintain the identical clearance angle on a series of drills which are being ground in succession unless the wheel is dressed so frequently as to render the operation uneconomical.

It is an object of the present invention to provide a drill grinder embodying improved means for regulating the clearance angle.

Another object is to provide positive means for maintaining a fixed distance between the tilting axis of the drill chuck and the wheel axis. This positive means is in the form of a gauge which can be set to provide different clearance angles.

A further object is to provide improved means for determining the clearance angle in combination with means for compensating for wheel wear.

A still further object is to provide an improved combination of a lip guide and a clearance angle gauge by means of which the desired clearance angle may be obtained.

The important elements in the present invention are the wheel axis adjustment, the clearance angle gauge, and the adjustment to compensate for wheel wear. The present invention also contemplates the use of means for adjusting the axial position of the drill in the drill chuck whereby a fine adjustment for drill feed may be provided.

Other objects, features and advantages will become apparent as the description proceeds.

With reference now to the drawings in which like reference numerals designate like parts.

Figure 1:
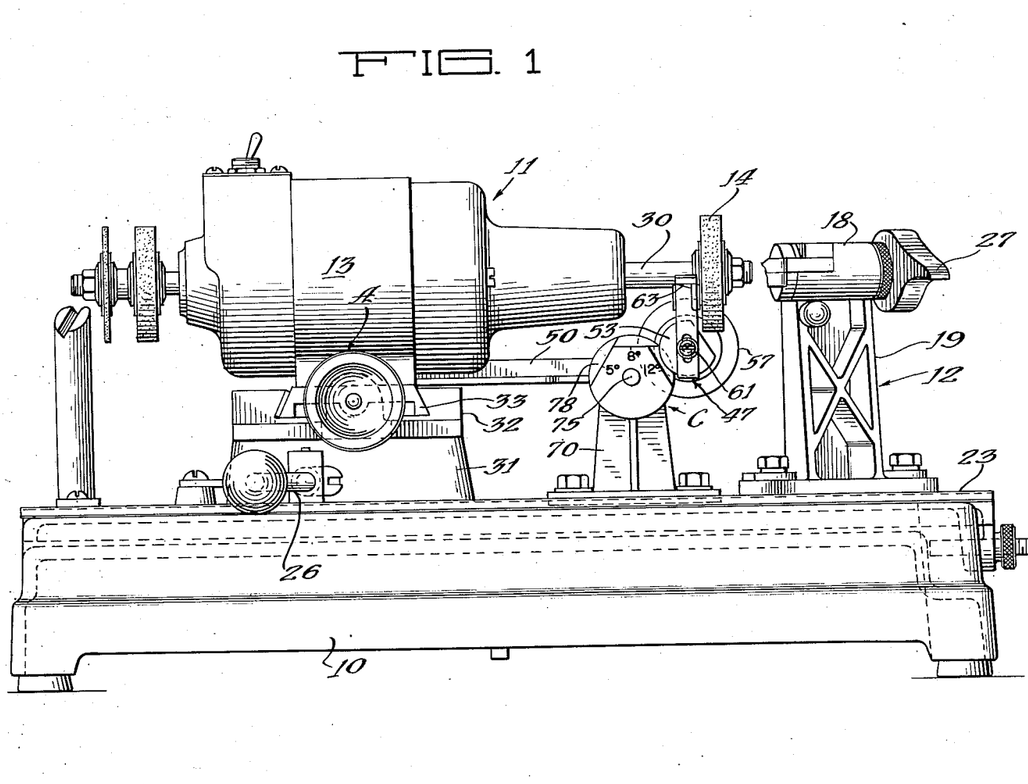
Fig. 1 is an elevation showing a preferred embodiment of my invention.
Figure 2:
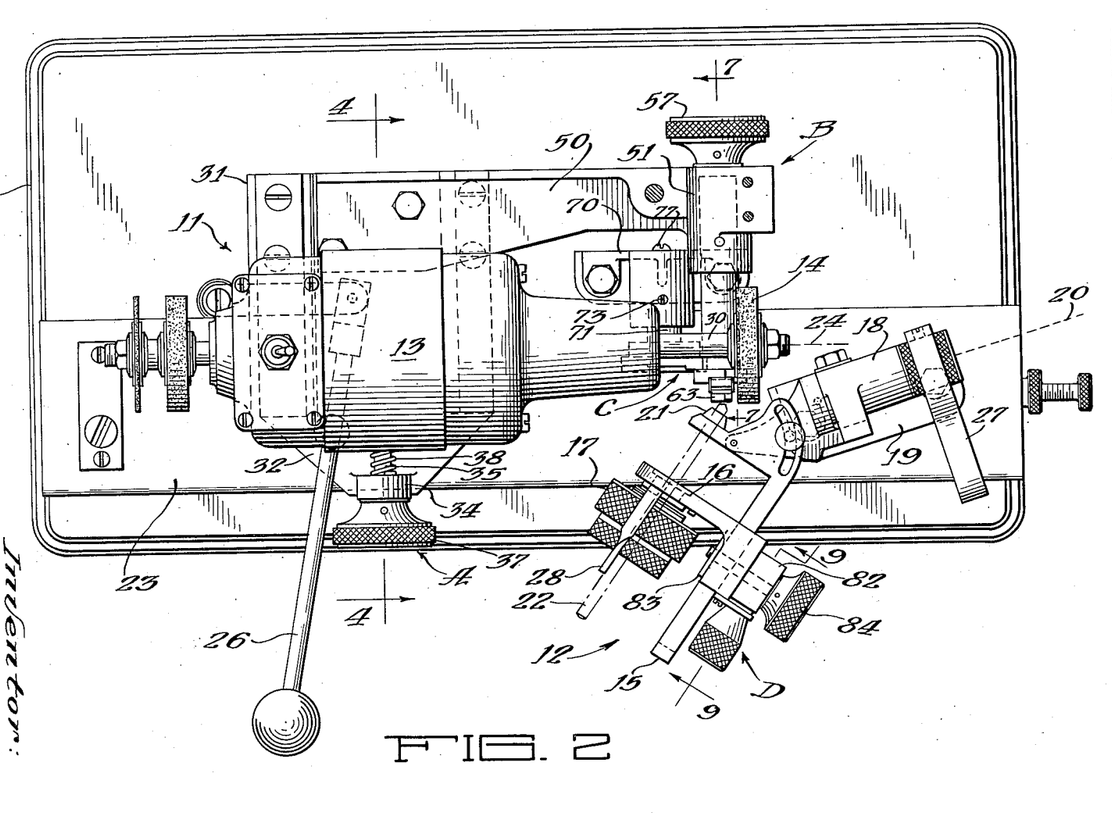
Fig. 2 is a plan view thereof.

With reference now to Figs. 1 and 2, the grinder comprises a base 10, a grinder assembly 11 mounted thereon for back and forth sliding movement, and a chuck assembly 12 mounted on the base for lateral sliding movement.

The grinder assembly comprises a motor 13 and a grinding wheel 14 which is driven thereby, and which, in the present embodiment, is shown as being mounted on an extended portion of the armature shaft 30.

The chuck assembly comprises a chuck arm 15 on which is slidably mounted a bracket 16. The chuck 17 is mounted in the slidable bracket 16. The chuck arm includes a shaft 18 which is journaled in a support 19 so that the chuck arm, its associated parts, and a drill 22 can be mounted for tilting rotation about an axis 20, referred to herein as the chuck axis. The chuck arm also includes means for mounting any one of a series of collets 21. The rear portion of the drill 22 is securely gripped by the chuck 17 and the front portion extends through a collet 21 of suitable size so that the point of the drill will be securely supported.

Figure 3:
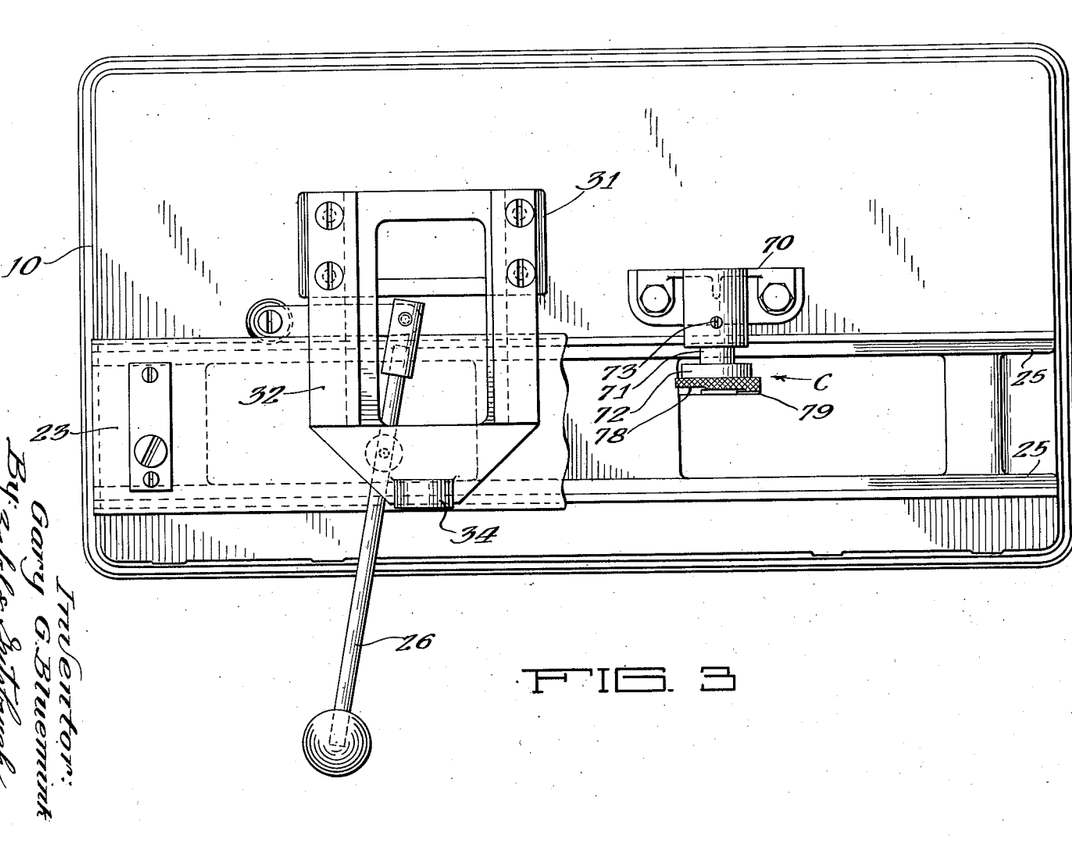
Fig. 3 is a plan view of the base and of certain of the parts associated therewith.
Figure 4:
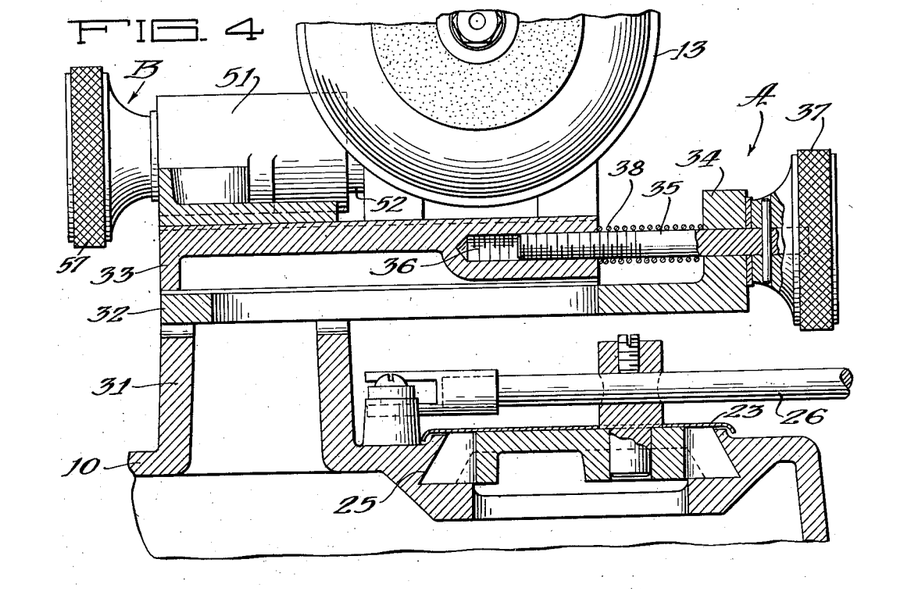
Fig. 4 is a section taken along line 4—4 of Fig. 2 showing the adjusting means for the grinder assembly.
Figure 5:
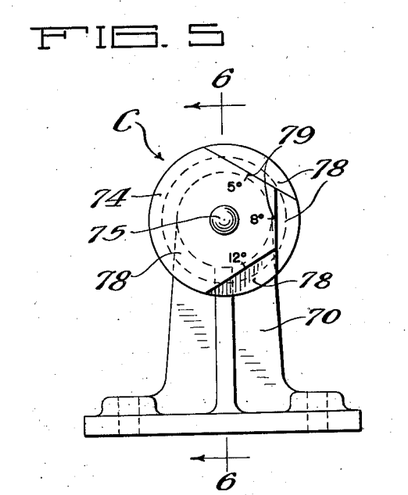
Fig. 5 is an enlarged elevation of the clearance angle gauge.
Figures 7, 8:
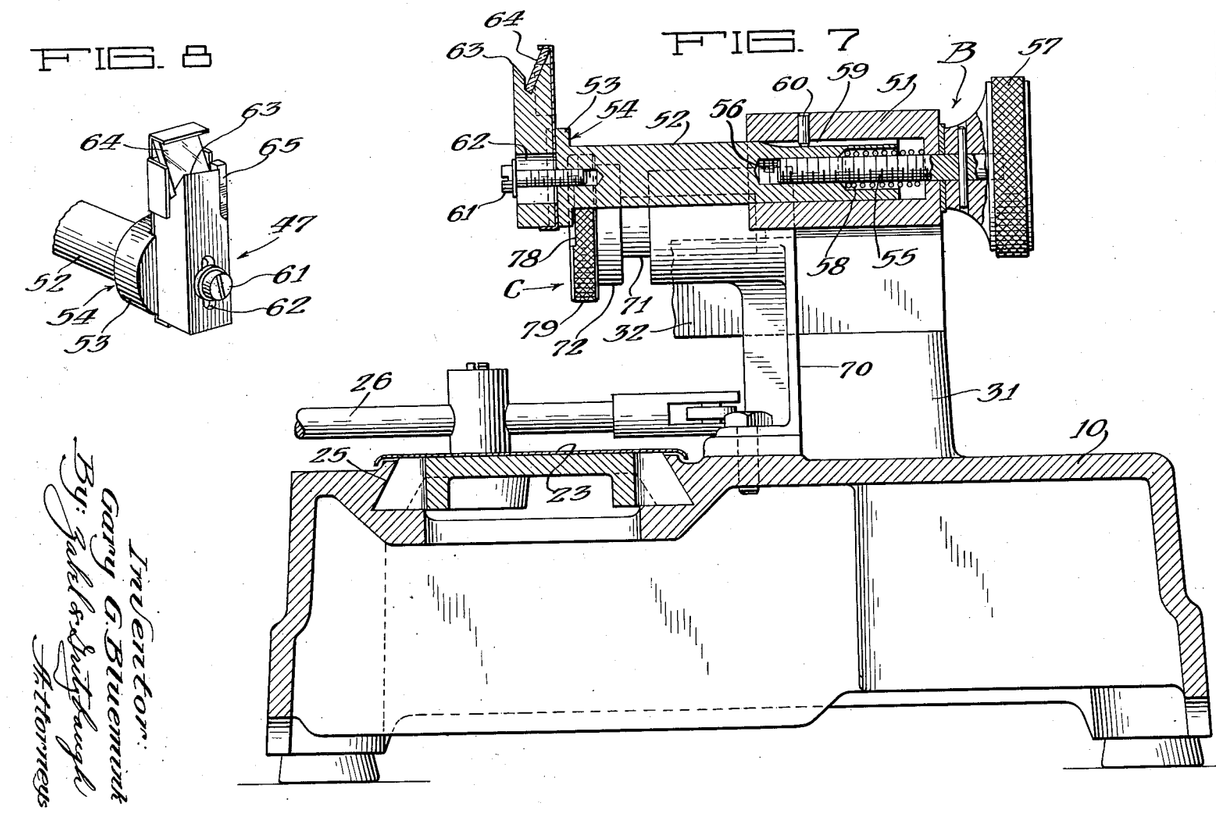
Fig. 7 is a section taken along line 7—7 of Fig. 2 showing the adjustable means for mounting the lip guide and adjustment surface.
Fig. 8 is a perspective view of the lip guide.

The support 19 and the chuck assembly is mounted on a slide 23 for lateral movement in a direction parallel to the wheel axis 24, this also being the axis of the armature shaft 30. The slide is mounted in ways 25 which are formed in the base, as shown in Figs. 3, 4 and 7. A slide lever 26 is provided for shifting the slide 23 and the chuck arm assembly in a lateral direction.

The grinder 11 is mounted for forward and back sliding movement so as to vary the distance between the wheel axis 24 and the chuck axis 20.

It will be observed, as shown in Figs. 3 and 4 that a boss 31 projects upwardly from the base 10, and a motor slide bracket 32 is secured thereto. A motor slide 33 is slidably mounted in suitable ways formed in the motor slide bracket. The motor slide bracket includes a forwardly and upwardly projecting journal 34 for a regulating screw 35. The latter takes into a threaded aperture 36 formed in the motor slide bracket, and at its front end is provided with a hand wheel 37. A coil spring 38 surrounds the screw 35 and is confined between the journal 34 and the motor slide 33 so that the slide will be urged rearwardly. Thus, the grinder may be moved forwardly or backwardly by rotating the hand wheel 37, thereby regulating the distance between the wheel axis 24 and the chuck axis 20.

This adjustment, represented by the hand wheel 37, can be referred to as the wheel axis adjustment A.

In addition to this adjustment, the grinder is provided with a lip guide adjustment B, a clearance angle gauge C and a drill feed adjustment D.

Figures 10, 11, 12:
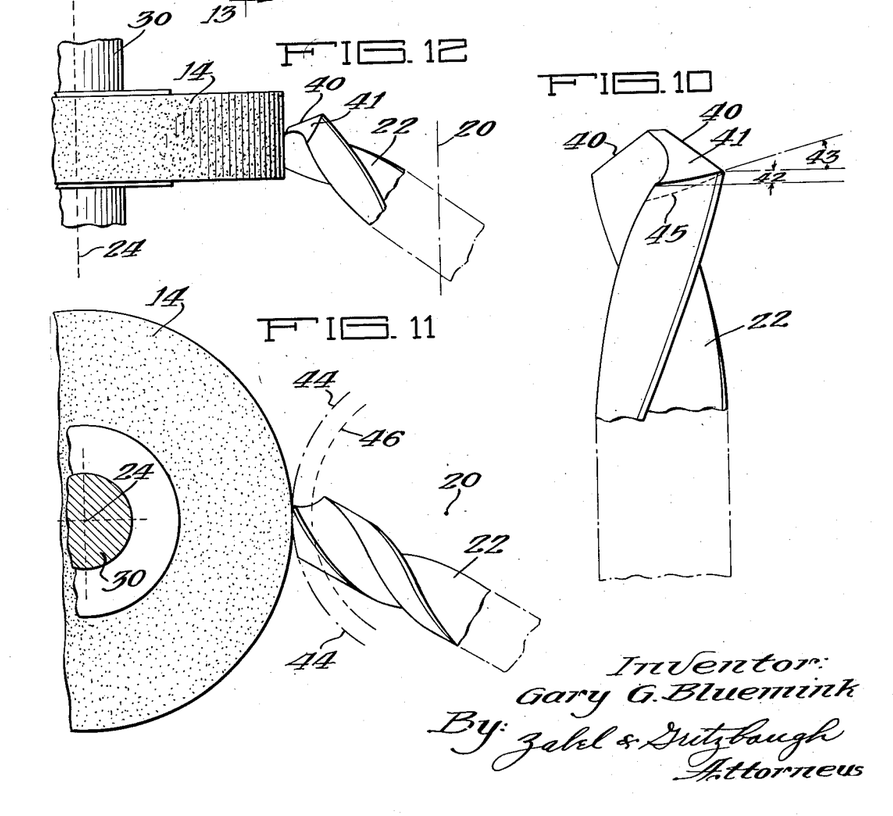
Fig. 10 is an enlarged view of the drill point.
Fig. 11 is a diagram illustrating the manner in which the point surface is generated.
Fig. 12 is a top view of the parts diagrammatically shown in Fig. 11.

In Fig. 10, the lips or cutting edges of the drill are designated by the reference numeral 40, and the point surfaces by the reference numeral 41. The lip clearance is shown by the dimension 42, and the clearance angle may be represented by the angle 43.

The point surface 41 is the surface of a body of revolution; that is, it may be a cylindrical or conical surface depending upon whether the axes 20 and 24 are parallel to each other or at an angle to each other. The manner in which this surface is generated is diagrammatically illustrated in Figs. 11 and 12, the chuck axis 20 being shown parallel to the wheel axis 24 for purposes of explanation.

As shown in Fig. 11, the drill 22 is eccentrically mounted with respect to chuck axis 20. The feed of the drill into the wheel 14 is accomplished by rotating the drill about the chuck axis. The cylindrical surface thus generated is indicated, in projection, by the circular line 44; the point surface 41 lies in this cylindrical surface.

The axis of the drill is disposed at a suitable angle with respect to the perpendicular of the wheel axis, as shown in Fig. 12, in order to provide the proper lip angle, such as a lip angle of 59°. However, the chuck arm 15 is adjustably mounted with respect to the shaft 18 so that the lip angle may be varied, this adjustment being shown in Fig. 2, but forming no part of the present invention.

The clearance angle is increased by decreasing the distance between the chuck axis 20 and the surface of the wheel 14, thus reducing the radius of the cylindrical surface 44. In Fig. 10, the dotted line 45 illustrates the increased clearance angle, and this dotted line 45 corresponds to a dotted line 46 in Fig. 11 which designates a cylindrical surface of smaller radius.

In the aforementioned patent, the variation of this distance is accomplished by movement of the chuck axis 20, with respect to a fixed point on the base, as represented by a lip guide. However, since the clearance angle depends upon the distance between the chuck axis and the wheel surface, this prior art arrangement is not satisfactory for it affords no convenient means for compensation due to wear of the grinding wheel.

According to the present invention, a lip guide 47 is provided which forms a part of the grinder assembly 11 and is movable therewith. The regulation of the clearance angle is effected by shifting the wheel axis 24 with respect to the stationary chuck axis 20 by means of adjustment A. Since the lip guide is carried by the adjustably mounted grinder, and since as hereinafter pointed out, the surface of the grinding wheel bears a predetermined relationship to the lip guide, it is possible to provide the desired clearance angle with a high degree of accuracy.

The lip guide 47 forms a part of the grinder assembly 11 and is adjustably mounted thereon by means which include the lip guide adjustment B. As shown in Figs. 1 and 2, the grinder assembly includes a horizontally disposed bracket 50 which is secured to the motor slide 33. The bracket terminates in a closed sleeve 51. A lip guide post 52 is received within the sleeve 51, and carries a head 53, the rear surface of which constitutes an abutment 54 for engagement with the clearance angle gauge C. These parts are shown in Fig. 7. A screw 55 takes into a threaded bore 56 formed in the post 52, the opposite end of the screw extending rearwardly through the closed end of the sleeve 51. A hand wheel 57 is secured to the end of the screw.

A spring 58 is confined between the post 52 and the closed end of the sleeve 51 to urge the post forwardly. The post 52 is provided with a keyway 59 which is engaged by a drive pin 60 in the sleeve 51 so that rotation of the hand wheel 57 will cause the post 52 and the lip guide 47 to be moved forwardly and backwardly with respect to the wheel axis. This adjustment, represented by the hand wheel 57, comprises the lip guide adjustment B.

The forward surface of the head 53 is slotted so as to receive the lip guide 47 which is secured thereto by means of a screw 61. The lip guide 47 is provided with a slot 62 through which the screw 61 extends, thereby permitting a vertical adjustment.

The lip guide 47 includes a guide edge 63 against which the lip of a drill is to be aligned in abutting or almost abutting relationship. Thus, the axial position of the drill, which determines its feed, is controlled by the position of the lip guide 47. Also, the angular orientation of the drill with respect to the drill axis is determined by the guide edge 63, since the lip is to be disposed parallel to the guide edge. A mirror 64 facilitates the rotation of the drill into parallelism with the guide edge, this being done before the chuck 17 is tightened up. It will be observed that the guide edge 63 is not disposed horizontally, but is disposed at a slight angle to the horizontal which corresponds to the proper angular orientation of the lip of the drill.

The lip guide 47 is also provided with a recessed portion forming a dressing gauge 65 against which a dressing tool may be abutted.

When the wheel becomes worn, a dressing tool is inserted in the chuck assembly, just as a drill is. The lip guide adjustment is tightened up to move the lip guide rearwardly to a small extent, corresponding to the amount of material to be removed from the wheel. Then, with the wheel rotating, and without tilting the chuck assembly, the dressing tool is moved back and forth across the wheel two or three times, this movement being accomplished by manipulation of the slide lever 26.

At the conclusion of this operation, the relationship between the guide edge 63 and the surface of the wheel is the proper relationship. The term "proper relationship" indicates a correspondence between the lip guide and the cylindrical or conical surface which is to be generated after accounting for the amount of metal which is to be removed from the point surface.

It can be pointed out here that the feeding action or feeding motion of the drill with respect to the wheel is the tilting motion of the drill about the chuck axis, rather than an axial feed. However, in order that the proper amount of metal be removed, it is necessary to adjust the axial position of the drill prior to the tilting and grinding operation. Therefore, in order to obtain the desired feed, it is necessary that the proper relationship exist between the lip guide and the wheel surface. To whatever extent this proper relationship is not maintained, to that extent will the radius of the generated surface vary, thereby producing a point having a different clearance angle than that indicated by the setting of the clearance angle gauge C.

Figure 6:
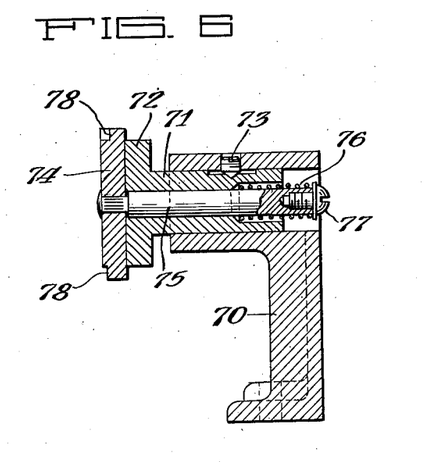
Fig. 6 is a section taken along line 6—6 of Fig. 5.

As indicated heretofore, according to the present invention, the position of the grinder assembly is determined by a clearance angle gauge C, subject to the lip guide adjustment B. As shown in Figs. 6 and 7, the clearance angle gauge comprises a bracket 70 which is suitably secured to the base 10. Received within the bracket is a bushing 71 having a head 72. The relationship between the bushing and bracket is maintained by a set screw 73, having a point which digs into a suitable flat provided in the bushing.

A disk gauge 74 is fixed on a stem 75, the stem being rotatably mounted in bushing 71. A spring 76 is confined between the bushing and a screw head 77, or screw head and washer so as to urge the rear surface of the disk gauge 74, against the head 72. The arrangement is such that the disk gauge can be rotated by hand so as to present any one of a plurality of gauge surfaces 78 into a position wherein the selected surface will engage the abutment surface 54. The gauge surfaces are plane surfaces which are milled or otherwise formed to a close degree of tolerance so as to control the position of the lip guide 47 and of the wheel axis 24. Suitable indicia 79 may be provided on the disk gauge to indicate the clearance angles which are obtained at the different sets of the clearance angle gauge C.

Thus, when the lip guide and the wheel surface are in their proper relationship, by setting the gauge C in its proper position, any one of several clearance angles can be maintained, because the gauge C will determine the distance between the wheel axis 24 and the chuck axis 20.

In setting the guage C, the grinder assembly is first moved forwardly by manipulating the wheel axis adjustment A, so that the abutment surface 54 will clear the gauge C, so as to permit rotation thereof. Then, the hand wheel of adjustment A is rotated in the reverse direction, permitting the spring 38, associated therewith, to move the grinder assembly rearwardly until the engagement of the abutment surface 54 with one of the gauge surfaces 78 prevents further rearward movement. The hand wheel 37 can be rotated beyond this point until the looseness of the adjustment A indicates that the surfaces 54 and 78 are in abutting engagement.

An important feature of the present invention is that the abutting surfaces 54 and 78 are so arranged as to provide a positive means for determining the distance between the axes 20 and 24. The pressure of the work against the wheel, incident to the tilting feed, tends to urge the wheel backwardly, with the result that inaccuracies would occur if the position of the parts were to be determined by frictional means or by spring-biased means. In the present arrangement, not only do the abutting surfaces 54 and 78 provide a positive blocking, but the arrangement of the screw 55 is such that there is a positive engagement between the hand wheel 57, or suitable washer adjacent thereto, with the closed end of the sleeve 51.

Thus, the radius of the cylindrical or conical surface 44 is positively determined by the gauge C, assuming that the lip guide and wheel surface are in their proper relationship. As previously indicated, they are in their proper relationship immediately after dressing.

The wheel wear incident to the grinding of a number of drills will gradually increase the radius of the point surface, thereby decreasing the clearance angle. The lip guide can then be brought into proper relationship by manipulation of lip guide adjustment B, and then re-dressing the wheel as pointed out above.

However, it is possible to compensate for the wheel wear without dressing. This compensation is approximate, and is effected by tightening up the lip guide adjustment B to an extent which is indicated by the "feel" of the grinding operation. This causes the grinder assembly to be moved forwardly with respect to the lip guide, thereby maintaining the same surface radius and the same clearance angle. This method of compensation can be readily effected by an experienced operator to a high degree of accuracy, with the result that the wheel life is lengthened materially. It can be pointed out that the depth of the dressing cut is approximately .010 to .015 inch. Therefore, if care is taken to distribute the wear evenly over the surface of the wheel, the number of the drills ground between dressing operations can be materially increased.

The drill feed adjustment D affords a convenient means for regulating the extent of feed, or the amount of metal removed from the drill.

Figures 9, 13:
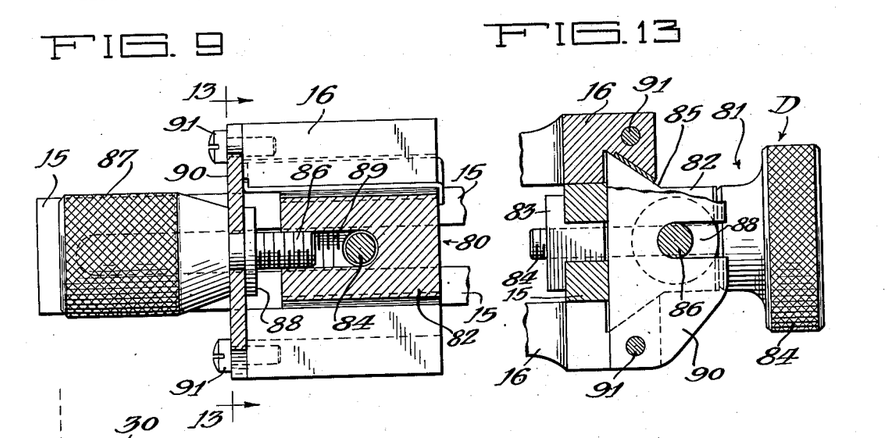
Fig. 9 is a section along line 9—9 of Fig. 2 showing the axial adjustment for the chuck and drill.
Fig. 13 is a section taken along line 13—13 of Fig. 9.

This adjustment is shown in Figs. 2, 9 and 13, and comprises a screw threaded adjustment which is associated with the slidable bracket 16 in which the chuck 17 is mounted. The chuck arm 15 is provided with a slot 80 in which a clamp 81 is slidably mounted. The clamp 81 includes a clamping block 82, a clamping plate 83 and a clamping screw 84. The clamping block and plate are disposed on opposite sides of the chuck arm 15, and the screw passes through the slot. Thus, the clamp may be locked in any position along the chuck arm.

The bracket 16 is slidably mounted on the clamping block 82 by a dovetail connection 85, as shown in Fig. 13. An adjusting screw 86, which is provided with a knob 87 and a collar 88, is threaded into a bore 89 formed in the clamping block 82. The knob 87 and the collar 88 are spaced from each other and are disposed on opposite sides of a slotted plate 90. The plate is secured to a portion of the bracket 16 by means of screws 91. The adjusting screw 86 passes through the slot so that rotation of the adjusting screw one way or the other will cause the bracket 16, and hence the chuck 17 and any drill which is held therein, to be shifted in an axial direction. This adjustment, represented by the knob 87, constitutes the drill feed adjustment D.

Whereas the relationship between the lip guide edge 63 and the dressing gauge 65 is such as to provide a standard amount of feed which is suitable in the majority of situations, situations may arise where a greater or lesser amount of feed is desired. The feed adjustment D will shift the drill forwardly or backwardly to produce this variation in feed. Of course, when the drill is shifted forwardly, the chuck assembly and the drill must be shifted laterally out of alignment with the lip guide. Also, situations may arise in which it is desirable to take a second cut on the drill, and this may be done by manipulation of the feed adjustment D without re-aligning the drill lip with the lip guide. This would be the case where the clearance angle of the drill is being changed, because this involves the formation of a conical surface of a different radius thereby causing the removal of a greater amount of metal.

Also, the feed adjustment D facilitates the initial alignment of the lip with the lip guide edge. Furthermore, where there is a slight amount of wear of the wheel surface, the drill feed adjustment permits an adequate cut to be made. In the latter situation, however, it does not substitute for the compensation provided by the lip guide adjustment B since the feed adjustment D will tend to reduce the clearance angle.

The operation has been pointed out in connection with the description of the various parts and assemblies. To summarize the operation, a drill 22, to be ground, is inserted in chuck 17, and the proper collet 21 is selected for supporting the front end of the drill. One of the drill lips 40 is aligned against the lip guide edge 63 for proper angular orientation, and the adjustment D facilitates the axial positioning of the drill so that it almost touches the lip guide 47. Assuming that the parts have been properly adjusted, and the motor is operating, the slide lever 26 is manipulated to bring the drill point into alignment with the wheel 14. At this time, the drill point is disposed beneath the wheel. Then the chuck assembly 12 is rotated about the chuck axis 20, an actuating lever 27 being provided for this purpose. This causes the drill point, and particularly the point surface 41 to be moved in a circular arc which intersects the wheel surface, thereby causing an amount of metal to be removed from the point surface which corresponds to the overlapping of these intersecting paths. Thus, a new edge or lip is provided for the drill, and a new point surface is generated.

The chuck assembly is then permitted to return to its horizontal position, as shown in Figs. 1 and 2, and the chuck 17 is indexed, assuming that a two lip drill is being sharpened, through 180° to present the other lip and other point surface to the grinding wheel. An indexing lever 28 is provided for this purpose. The indexing lever 28 as well as the angular adjustment between the chuck arm 15 and the shaft 18, is described in greater detail in the aforementioned patent; these features form no part of the present improvement.

In the event that an insufficient amount of metal has been removed during the grinding operation, the drill feed adjustment D can be operated to feed the drill forwardly so that the second grind or cut can be made.

Figures 14, 15, 16, 17, 18:
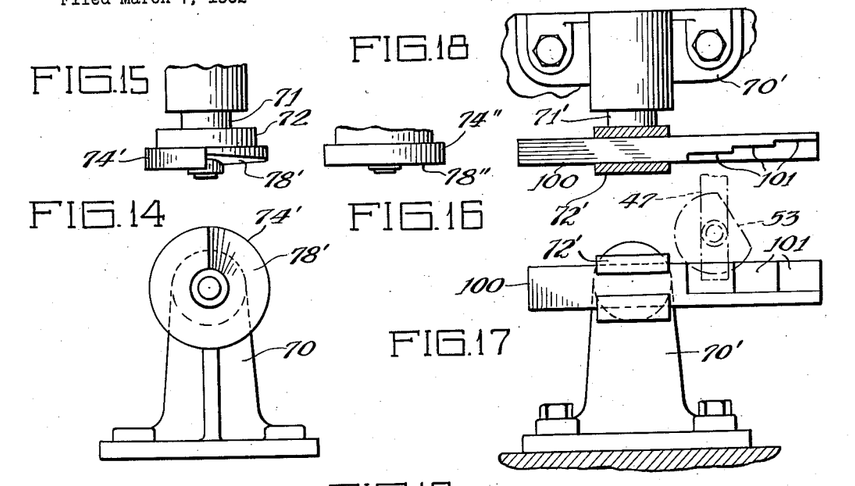
Fig. 14 is an elevation similar to Fig. 5, but showing a modified form of clearance angle gauge.
Fig. 15 is a plan view of a portion of Fig. 14.
Fig. 16 is a plan view similar to Fig. 15, but showing a further modification.
Figs. 17 and 18 are elevation and plan views, respectively, similar to Figs. 14 and 15, but showing still another modified form of clearance angle gauge.

The clearance angle of the new point surface is determined by the clearance angle gauge C. As described herein, this gauge is in the form of a disk gauge 74 with several gauge surfaces 78; however, it could equally well be in the form of a disk gauge 74', as shown in Figs. 14 and 15, which is provided with a cam shaped gauge surface 78' so as to provide an infinite number of adjustments. In the case of a special installation, where only one clearance angle is to be ground, the gauge can provide just a single gauge surface. For instance, as shown in Fig. 16, a disk gauge 74" is shown which is provided with a single gauge surface 78".

Similarly, a sliding gauge could be substituted for the disk shaped type herein shown without departing from the spirit of the present invention. Figs. 17 and 18 show a bracket 70' which receives a bushing 71' having a head 72'. The head is slotted so as to slidably receive a slidable gauge member 100 having a plurality of stepped gauge surfaces 101, which cooperate with the rear surface of the head 53 of the lip guide 47 in the same manner as pointed out in connection with the disk gauge 74.

The operator, by manipulating the lip guide adjustment B according to the "feel" of the grinding operation, can compensate for wear of the grinding wheel, and thus maintain approximately the proper relationship between the lip guide and wheel surface and hence approximately the same clearance angle, on a whole succession of drills, thereby lengthening the number of grinding operations between wheel dressings.

The lip guide and the wheel surface are brought into exactly the proper relationship by dressing the wheel at proper intervals, in the manner heretofore described in detail.

In all instances, where it is desired to tighten up on the lip guide adjustment B, it is desirable to move the grinder assembly forwardly by the wheel axis adjustment A, and then return the grinder assembly to its new position after the lip guide adjustment has been made. Of course, changing the clearance angle gauge involves first moving the motor assembly by adjustment A so that proper clearance may be obtained between the abutting surfaces to permit the rotation of the clearance angle gauge C.

Although, in this particular embodiment, the lateral shifting of the drill chuck with respect to the grinder assembly is provided by mounting the drill chuck on a lateral slide 23, the same results could be secured by mounting the boss 31 on the lateral slide, and mounting the chuck assembly 12 directly on the base.

Figures 19, 20:
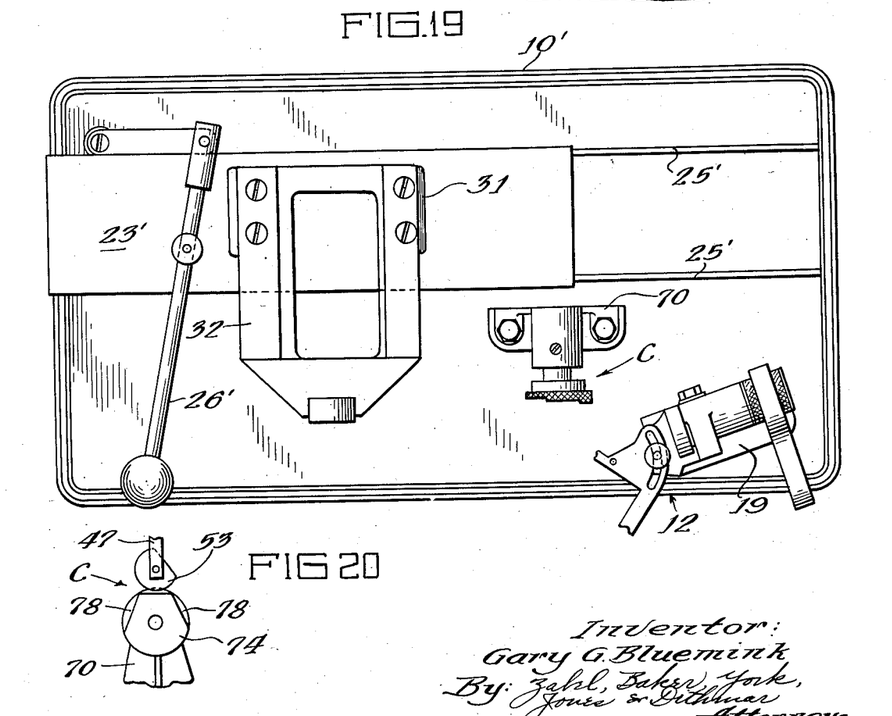
Fig. 19 is a plan view of the base, similar to Fig. 3, but showing a modified arrangement of the parts.
Fig. 20 is a detailed elevational view showing the relative positions of the clearance angle gauge and the lip guide in the modification of Fig. 19.

This last-mentioned arrangement is shown in Fig. 19 in which the base 10' is provided with ways 25' to accommodate a lateral slide 23' on which the boss 31 is mounted. A slide lever 26' is provided for shifting the slide. This figure, which in other respects is similar to Fig. 3, shows the boss 31 and the motor slide bracket 32 as being mounted on the slide 23' for shiftable movement with respect to the clearance angle gauge C and the chuck assembly 12, and its support 19, which are mounted directly on the base 10'. As shown in Fig. 20, the clearance angle gauge C is mounted directly below the head 53 of the lip guide 47.

In referring to the distance between the wheel axis and the chuck axis, reference is actually being made to the distance between the wheel axis and a given point on the chuck axis, since these axes are not necessarily disposed in parallel relationship.

Although only a preferred embodiment of the invention has been shown and described herein, it is obvious that various modifications and changes may be made in the construction shown without departing from the spirit of the invention as pointed out in the appended claims.

I claim:

1. A drill grinder comprising a base, a drill chuck mounted for tilting movement about a horizontal chuck axis, a grinder assembly including a grinding wheel turning on a horizontal wheel axis, a lip guide, and a clearance angle gauge, said grinder assembly being adjustably mounted on said base for forward and back movement to regulate the position of said wheel axis with respect to said chuck axis, means for mounting said chuck on said base for movement only in a direction parallel to said wheel axis so that movement of said chuck will not vary the distance between said chuck axis and said wheel axis, said lip guide being mounted on said grinder assembly, and said clearance angle gauge being mounted on said base for engagement by said lip guide whereby the distance between said wheel axis and said chuck axis is determined by said gauge.

2. A drill grinder comprising a base, a drill chuck mounted for tilting movement about a chuck axis, a grinder assembly including a grinding wheel, a lip guide, a clearance angle gauge, said grinder assembly being adjustably mounted on said base for forward and back movement to regulate the position of the axis of said grinding wheel with respect to said chuck axis, said chuck being mounted on said base for movement only in a direction parallel to said wheel axis so that movement of said chuck will not vary the distance between said chuck axis and said wheel axis, said lip guide being mounted on said grinder assembly, and said clearance angle gauge being mounted on said base for engagement by said lip guide whereby the distance between said wheel axis and said chuck axis may be determined by said gauge, and means for adjustably mounting said lip guide with respect to said grinder assembly for regulating the distance between said chuck axis and said wheel axis to compensate for wheel wear.

3. In a drill grinder of the type having a drill chuck tiltable about a chuck axis and a lip guide, the combination of a base, a grinder assembly, means for slidably mounting said grinder assembly on said base for movement in a direction toward and away from said drill chuck, a slide on said base for movement in a direction substantially parallel to the wheel axis of said grinder assembly, said drill chuck being mounted on said slide, said lip guide being mounted on said grinder assembly for movement therewith with respect to said base, and a gauge mounted on said base and engaging said lip guide to determine the spacing between said wheel axis and said chuck axis.

4. A drill grinder as claimed in claim 3 in which said gauge provides a forwardly facing gauge surface, and in which said lip guide provides a rearwardly facing abutment surface, thereby providing positive means for determining the distance between said wheel axis and said chuck axis.

5. A drill grinder as claimed in claim 3 in which said gauge comprises a rotatably mounted disk provided with a plurality of gauge surfaces adapted for selective engagement with said lip guide whereby the distance between the wheel surface and the chuck axis may be regulated to provide different clearance angles on the drill held in said drill chuck.

6. In a drill grinder of the type having a drill chuck tiltable about a chuck axis and a lip guide including a dressing gauge for establishing a proper relationship between a lip guide and the wheel surface, the combination of a base, a grinder assembly, means for slidably mounting said grinder assembly on said base for movement in a direction toward and away from said drill chuck, means for mounting said drill chuck on said base for movement only in a direction parallel to the wheel axis of said grinder assembly so that movement of said chuck will not vary the distance between said chuck axis and said wheel axis, said lip guide being mounted on said grinder assembly for movement therewith with respect to said base, a gauge mounted on said base and engaging said lip guide to determine the spacing between said wheel axis and said chuck axis, and means for adjusting the position of said lip guide with respect to said wheel axis so as to compensate for wheel wear.

7. A drill grinder as claimed in claim 6 in which said adjustable means for mounting said lip guide includes a bracket forming a part of said grinder assembly, said bracket providing a rearwardly facing surface, said lip guide being adjustably mounted on said bracket and having a portion disposed in front of and in alignment with said rearwardly facing surface, and a screw passing through said bracket and engaging said lip guide portion in screw threaded relationship, said screw having a head engaging said rearwardly facing surface whereby forward movement of said lip guide with respect to said bracket is positively limited by the engagement of said screw head with said rearwardly facing surface.

8. In a drill grinder of the type having a drill chuck tiltable about a chuck axis and a lip guide including a dressing gauge for establishing a proper relationship between the lip guide and the wheel surface, the combination of a base, a grinder assembly, means for slidably mounting said grinder assembly on said base for movement in a direction toward and away from said drill chuck, a slide on said base for movement in a direction substantially parallel to the wheel axis of said grinder assembly, said drill chuck being mounted on said slide, said lip guide being mounted on said grinder assembly for movement therewith with respect to said base, a gauge mounted on said base and engaging said lip guide to determine the spacing between said wheel axis and said chuck axis, and means for adjusting the axial position of said drill chuck with respect to said chuck axis.

References Cited in the file of this patent

UNITED STATES PATENTS

| | | |
|---|---|---|
| 166,515 | Eddy | Aug. 10, 1875 |
| 1,919,545 | Fisher | July 25, 1933 |
| 2,032,538 | Kulp et al. | Mar. 3, 1936 |
| 2,142,923 | Stocking | Jan. 3, 1939 |
| 2,289,693 | Blazek | July 14, 1942 |
| 2,294,047 | Pollock | Aug. 25, 1942 |
| 2,328,650 | Johnson et al. | Sept. 7, 1943 |
| 2,371,676 | Coyne | Mar. 20, 1945 |
| 2,408,618 | Fielding | Oct. 1, 1946 |
| 2,596,916 | Raney | May 13, 1952 |

FOREIGN PATENTS

| | | |
|---|---|---|
| 344,367 | France | Sept. 3, 1904 |